April 4, 1961  N. B. BRAYMER  2,978,625
SERVOMECHANISM
Filed June 19, 1957

INVENTOR.
NOEL B. BRAYMER

BY HIS ATTORNEYS.
HARRIS, KIECH, FOSTER & HARRIS

United States Patent Office 2,978,625
Patented Apr. 4, 1961

2,978,625

SERVOMECHANISM

Noel B. Braymer, Garden Grove, Calif., assignor to Beckman Instruments, Inc., Fullerton, Calif., a corporation of California Filed June 19, 1957, Ser. No. 666,609

5 Claims. (Cl. 318—448)

This invention relates to a servomechanism and, in particular, to a servomechanism especially suitable for use with error signal sources having low signal-to-noise ratios and error signal sources producing high frequency noise, such as occurs in the operation of double-beam spectrophotometers.

A servomechanism includes a motor or actuator which produces a relatively powerful mechanical force with the servomotor being controlled by an external source which is commonly referred to as the "error signal." This error signal is usually an electrical voltage or some physical phenomenon converted into an electrical voltage by means of a transducer. Where the error signal level is high, conventional servomechanism techniques are adequate. However, where the signal level is low or where there is noise or interference present, practical limitations will limit the performance of the servomechanism system. A "noise" is ordinarily defined as the random variations existing either in the physical phenomena or in the electrical voltage representing the error signal and the instantaneous magnitude of the noise may greatly exceed the instantaneous magnitude of the error signal and may be of a higher, lower and/or same frequency as the error signal. The practical limitations which occur are due to static friction, saturation of the motor velocity, motor inertia, nonlinearity of elements, and the like. It is an object of this invention to provide a servomechanism which can be operated from an error signal source producing relatively high frequency noise with a low signal-to-noise ratio while substantially eliminating the effects of these practical limitations.

A further object of the invention is to provide such a servomechanism which may be used to drive a reference beam control in a double-beam spectrophotometer in which the magnitude of the reference beam is varied to match the magnitude of the sample beam.

A well known technique for improving the performance of a servomechanism is to use a tachometer generator which produces an electrical signal proportional to the instantaneous velocity of the servomotor. This electrical signal, which is ordinarily referred to as a "feed-back signal," is combined with the error signal in such a sense as to cause the servomotor to slow down. In order to compensate for this slowing of the servomotor output, the error signal is greatly amplified to produce the same velocity of the servomotor in its linear region of operation that would be attained if the feed-back signal from the tachometer generator were not used. When the servomotor is not moving, there will be no feed-back from the tachometer generator and the incoming error signal will be greatly amplified, thereby very easily overcoming static friction in the system. But such improvement in operation is attained only when there is no significant noise in the system.

A servomotor has a finite maximum acceleration and a finite maximum velocity and the velocity feed-back signal is proportional to the actual velocity of the servomotor. When the error signal source produces noise which is of the same order of magnitude as the error signal to which the servomechanism is desirably responsive and this noise is of a higher frequency than the servomotor is capable of following, this noise will not be reduced in magnitude by the feed-back signal from the tachometer generator since the servomotor will not be responding to these frequencies and the noise will become very large relative to the error signals in the operating range of the servomotor. Since all of the electrical voltages being fed to the servomotor are being greatly amplified, the noise may overload the amplifier and prevent proper operation of the servomechanism.

It is an object of the invention to provide a servomechanism which will overcome the deficiencies outlined above. A further object of the invention is to provide such a servomechanism utilizing a feed-back loop producing a feed-back signal which is combined with an electronically integrated error signal for driving the servomotor through an amplifier.

A further object of the invention is to provide such a servomechanism in which the feed-back loop includes a position feed-back device producing a feed-back signal which is a function of the position of the servomotor.

A further object of the invention is to produce such a servomechanism in which conventional stabilization techniques of lead networks, tachometer generators, and the like can be used within the feed-back loop.

It is another object of the invention to provide a servomechanism which may utilize as a power device a servomotor which may be operated electrically, hydraulically pneumatically, or the like, while utilizing electronic integration of the error signal.

The invention also comprises novel details of construction and novel combinations and arrangements of parts, which will more fully appear in the course of the following description. The drawing merely shows and the description merely describes preferred embodiments of the present invention which are given by way of illustration or example.

Figure 1:
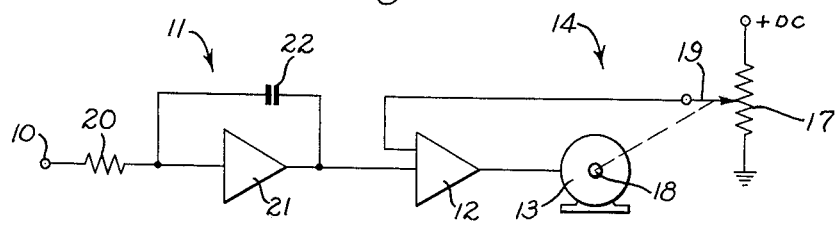
Fig. 1 is a schematic diagram of a preferred embodiment of the invention.

Referring now to the servomechanism illustrated in Fig. 1, the error signal source may be coupled to an error signal terminal 10, the error signal terminal 10 being coupled through an integrating circuit 11 to an amplifier 12. The output of the amplifier 12 is connected to a servomotor 13 in driving relationship which, in turn, is mechanically connected to a feed-back loop 14. The servomotor 13 may also be adapted for driving a controlled element to modify the error signal and/or to indicate or record the position of the controlled element. The various diagrams used herein are conventional single line diagrams indicating the mechanical and electrical connections between various elements, the mechanical connections being shown as dashed lines and the electrical connections as solid lines. The particular internal make-up of the amplifiers, motors, etc., may be produced by anyone skilled in the art and are not considered part of the invention.

The feed-back signal from the feed-back loop 14 is connected to the input of the amplifier 12 in subtractive relationship to the signal from the integrating circuit 11 so as to reduce the output of the servomotor. The particular feed-back loop shown herein comprises a voltage divider or potentiometer 17 which is connected across a D.C. voltage source to provide a D.C. voltage signal. Output shaft 18 of the servomotor 13 is mechanically connected to arm 19 of the potentiometer 17 to control the magnitude of the feed-back signal, such signal being a function of the angular position of the servomotor shaft.

The integrating circuit 11 provides for electronic integration of the voltages applied to the error signal terminal 10, these integrated voltages being coupled to the input of the amplifier 12. The integrating circuit as shown in Fig. 1 comprises a resistor 20 serially connected to a parallel combination of an amplifier 21 and a capacitor 22.

The integrating circuit is designed to operate over the entire range of input voltages which may be applied to the error signal terminal 10 and the characteristic time constant of the integrating circuit is determined by selecting the magnitudes of the various electrical elements therein. That portion of the servomechanism consisting of the amplifier 12, the servomotor 13, and the feed-back loop 14 will have a time constant determined primarily by the characteristics of the particular servomotor used and it is preferred to have the characteristic time constant of the integrating circuit large relative to the time constant of the servomotor loop. When the error signal is at a relatively high level, it is relatively free from noise, since the magnitude and frequency of the noise are independent of the signal level. When operating under these high signal level conditions, it will sometimes be desirable to reduce the characteristic time constant of the integrating circuit to a value which is comparable with the time constant of the servomotor loop previously referred to. Since the integrating circuit is completely electronic, the time constant thereof may be changed by switching action initiated by a particular magnitude of error signal or the integrating circuit may be by-passed completely by the switching action.

Figure 2:
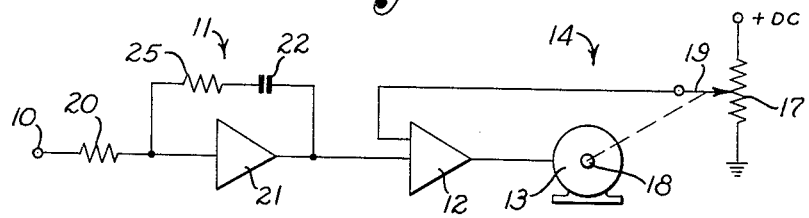
Fig. 2 is a schematic diagram of an alternative embodiment of the invention.

A preferred embodiment of the invention providing for modification of the time constant of the integrating circuit is shown in Fig. 2, wherein elements identical to those of Fig. 1 are indicated by the same reference numbers. A resistor 25 is connected in series with a capacitor 22 across the amplifier 21. In this embodiment, the electronic integrating circuit continues to integrate voltages at frequencies below the value determined by the combination of capacitor 22 and resistor 25. At frequencies above this critical frequency, the integrating circuit ceases to integrate and becomes a conventional electronic amplifier and the servomechanism becomes a conventional high-gain system.

Figure 3:
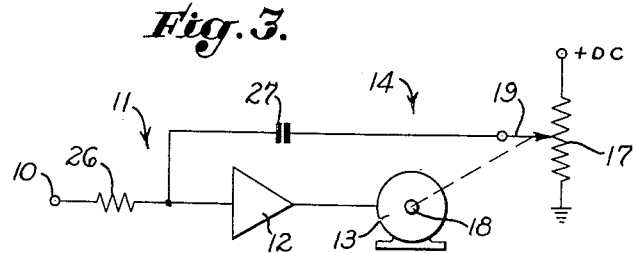
Fig. 3 is a schematic diagram of another alternative embodiment of the invention.

In the embodiment of Fig. 3, the error signal terminal 10 is connected to the input of the amplifier 12 through a resistor 26 and the arm 19 of the potentiometer 17 is coupled to the input of the amplifier 12 through a capacitor 27, the resistor 26 and capacitor 27 functioning as the integrating circuit 11. The operation of this simplified embodiment is the same as that of the embodiment of Fig. 1. It should be noted that the servomotor 13 utilized in all of these embodiments may be an electric motor, a hydraulic motor, a pneumatic motor, or even a steam engine, all of these except the last being extensively used at the present time.

Figure 4:
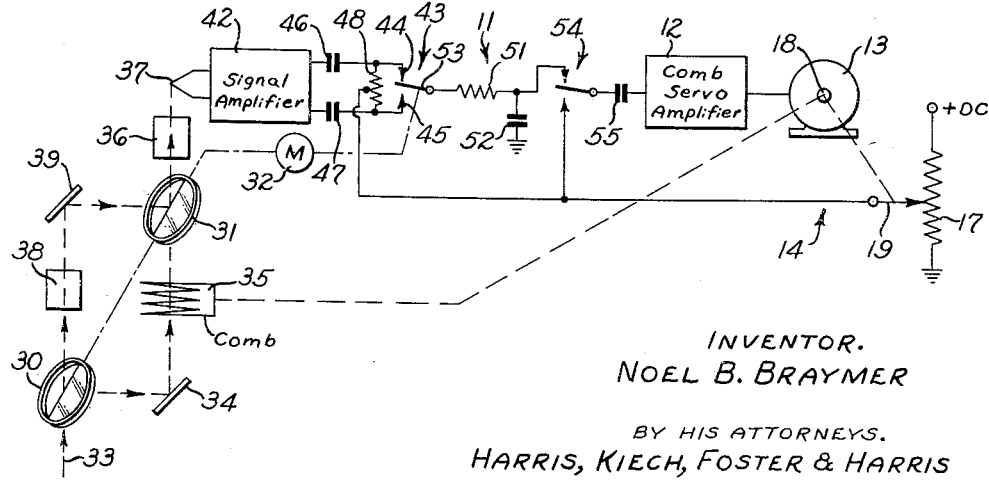
Fig. 4 is a schematic diagram of an embodiment of the invention operated in conjunction with a double-beam spectrophotometer.

Fig. 4 illustrates the specific application of the servomechanism of the invention to the control of the reference beam comb of a double-beam spectrophotometer. In such an instrument, a beam of light is divided into two parts. One part of the beam is passed through a sample cell containing material which may absorb a portion of the energy of the beam. The second part of the beam is directed past a beam control element, namely the reference beam comb, which controls the energy passing thereby. Then the energy difference of the two parts of the beam is determined and the amount of energy of the second part of the beam passing the control element is varied as a function of the difference in energy to reduce this difference to zero. The difference in energy serves as the error signal for the servomechanism and the servomotor drives the comb which controls the amount of energy in the second part of the beam. The physical position of the comb gives a continuous measure of the energy absorbed in the sample cell.

Referring specifically to Fig. 4, two half mirrors 30, 31 are synchronously rotated by a motor 32. During one half cycle of the rotation, an incoming beam of light indicated by the arrow 33 is reflected by the mirror 30 to another mirror 34, past a comb 35, and through the mirror 31 and a monochromator 36 to a thermocouple 37. During the other half cycle of rotation, the incoming beam passes through the mirror 30, through a sample cell 38, and is reflected by a mirror 39 and the mirror 31 through the monochromator 36 to the thermocouple 37. The radiant energy impinging on the thermocouple 37 is converted to electrical energy and is amplified in a signal amplifier 42. This signal is converted to D.C. by a synchronous rectifier 43 also driven by the motor 32 so as to operate in synchronism with the rotating half mirrors 30, 31.

The synchronous rectifier 43 includes fixed contacts 44, 45 which are connected to the output of the amplifier 42 through capacitors 46, 47, respectively, a resistor 48 being connected across the contacts. The integrating circuit 11 comprises a series resistor 51 and a shunt capacitor 52, the resistor 51 connecting moving arm 53 of the synchronous rectifier 43 to a signal comparator 54, the capacitor 52 being connected between the resistor 51 and ground. The feed-back signal from the arm 19 in the feed-back loop 14 is connected to the signal comparator 54 and also to the mid-point of the resistor 48.

The signal comparator 54 may be a conventional chopper or vibrator operating at line frequency, such as 60 cycles per second or 400 cycles per second, with the two signals being connected to the fixed contacts and the output appearing at the moving contact. The output from the signal comparator is then coupled to the amplifier 12 through a coupling capacitor 55. The output shaft 18 of the servomotor which is connected to the arm 19 of the potentiometer 17 is also connected to the comb 35 to mechanically move the comb for varying the amount of light passing between the mirror 34 and the mirror 31, thus controlling the energy difference appearing at the thermocouple 37.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

I claim as my invention:

1. In a servomechanism for operation with an error signal source having a low signal-to-noise ratio, the combination of: a servomotor for mechanically driving a load; an amplifier connected to said servomotor in driving relationship, said amplifier having an error signal input and a feed-back input connected in subtractive relationship; a servomotor feed-back loop mechanically driven by said servomotor and providing a feed-back signal to said feed-back input of said amplifier as a function of the movement of said servomotor; an error signal terminal for connection to the error signal source; and an electronic integrating circuit coupled between said error signal terminal and said error signal input of said amplifier for applying an integrated error signal to said error signal input.

2. In a servomechanism for operation with an error signal source having a low signal-to-noise ratio, the combination of: a servomotor for mechanically driving a load; an amplifier connected to said servomotor in driving relationship, said amplifier having an error signal input and a feed-back input connected in subtractive relationship; a feed-back signal source producing an electrical feed-back signal as a function of a mechanical motion; means coupling said servomotor to said feed-back signal source to mechanically drive said source; means coupling said electrical feed-back signal to said feed-back input of said amplifier; an error signal terminal for connection to the error signal source; and an electronic integrating circuit coupled between said error signal terminal and said error signal input of said amplifier for applying an integrated error signal to said error signal input.

3. In a servomechanism for operation with an error signal source having a low signal-to-noise ratio, the combination of: a servomotor for mechanically driving a load; a first amplifier connected to said servomotor in driving relationship, said first amplifier having an error signal input and a feed-back input connected in subtractive relationship; servomotor feed-back loop mechanically driven by said servomotor and providing a feed-back signal to said feed-back input of said first amplifier as a function of the movement of said servomotor; an error signal terminal for connection to the error signal source; and circuit means for coupling said error signal terminal to said error signal input of said first amplifier, said circuit means comprising a resistance element connected in series with a parallel combination of a second amplifier and a capacitance element, said resistance element being connected between said error signal terminal and said parallel combination.

4. In a servomechanism for operation with an error signal source having a low signal-to-noise ratio, the combination of: a servomotor for mechanically driving a load; a first amplifier connected to said servomotor in driving relationship, said first amplifier having an error signal input and feed-back input connected in subtractive relationship; a servomotor feed-back loop mechanically driven by said servomotor and providing a feed-back signal to said feed-back input of said first amplifier as a function of the movement of said servomotor; an error signal terminal for connection to the error signal source; and first circuit means for coupling said error signal terminal to said error signal input of said first amplifier, said first circuit means comprising a first resistance element connected in series with a second circuit means, said first resistance element being connected between said error signal terminal and said second circuit means, said second circuit means comprising a second amplifier connected in parallel with a series combination of a second resistance element and a capacitance element.

5. In a servomechanism for operation with an error signal source producing high frequency noise with a low signal-to-noise ratio, the combination of: means for electronically integrating the error signal to produce an integrated error signal; a servomotor; means for producing a feed-back signal which is a function of the position of said servomotor; means for combining said integrated error signal and said feed-back signal in subtractive relationship to produce a resultant signal; and means for energizing said servomotor as a function of said resultant signal.

References Cited in the file of this patent
UNITED STATES PATENTS

| | | |
|---|---|---|
| 2,519,667 | Koenig | Aug. 22, 1950 |
| 2,528,924 | Vassy | Nov. 7, 1950 |
| 2,668,264 | Williams | Feb. 2, 1954 |
| 2,817,769 | Siegler et al. | Dec. 24, 1957 |
| 2,864,278 | Sparks | Dec. 16, 1958 |
| 2,888,623 | Atwood | May 26, 1959 |